(12) United States Patent
Lau et al.

(10) Patent No.: US 8,613,068 B2
(45) Date of Patent: Dec. 17, 2013

(54) CROSS-DOMAIN SESSION REFRESH

(75) Inventors: Eric Wai Ho Lau, Mountain View, CA (US); Peter Wu, Cupertino, CA (US); Jeremy Hay, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 51 days.

(21) Appl. No.: 13/197,815

(22) Filed: Aug. 4, 2011

(65) Prior Publication Data

US 2013/0036460 A1 Feb. 7, 2013

(51) Int. Cl.
H04L 29/06 (2006.01)
(52) U.S. Cl.
USPC ........................................ 726/8; 726/3; 726/6
(58) Field of Classification Search
USPC ....................................... 726/3, 6, 8
See application file for complete search history.

(56) References Cited

U.S. PATENT DOCUMENTS

| | | |
|---|---|---|
| 7,487,539 B2 | 2/2009 | Ramachandran |
| 7,636,941 B2 | 12/2009 | Blinn |
| 7,809,785 B2 | 10/2010 | Appleton |
| 2004/0002878 A1 | 1/2004 | Maria Hinton |
| 2009/0037517 A1 | 2/2009 | Frei |
| 2010/0057829 A1 | 3/2010 | Sedlacek |
| 2010/0242092 A1* | 9/2010 | Harris et al. ...................... 726/3 |

OTHER PUBLICATIONS

"Cross-Domain Single Sign-On Session", Sun Java System Access Manager 7.1 Technical Overview, Retrieved Date: May 23, 2011, Oracle Corporation, http://download.oracle.com/docs/cd/E19462-01/819-4669/adrbn/index.html.
Mckerrell, John, "Resizing iFrames Across Domains", Blog What I Made, Posting Date: Oct. 22, 2006, Retrieved Date: May 23, 2011 http://blog.johnmckerrell.com/2006/10/22/resizing-iframes-across-domains/.

* cited by examiner

Primary Examiner — Justin T Darrow
(74) Attorney, Agent, or Firm — Wolfe-SBMC (57) ABSTRACT

Various embodiments utilize redirection techniques to refresh an authenticated session for a web-based executable operated across multiple domains. In at least some embodiments, the redirection techniques utilize a hidden inline frame ("iframe") to refresh an authenticated session. In some embodiments, polling is utilized to detect the end of a redirection sequence and a refreshed authenticated session while in other embodiments, an authenticated session is assumed to be refreshed after the expiration of a predetermined period of time.

20 Claims, 6 Drawing Sheets

CROSS-DOMAIN SESSION REFRESH

BACKGROUND

Many websites require a user to input a login identifier, or login ID, and a password before their web servers will grant access to information, products, and services to the user. The combination of the login ID and associated password allows the website to authenticate the user during subsequent visits to the website. Using multi-site user authentication systems, a web user can maintain a single login ID and associated password for accessing multiple, affiliated web servers or services on various domains.

Often, such systems employ "silent" authentication to sign the user into a site or service without re-asking for user credentials (including the user's login ID and password) when the user has previously signed in to an affiliated site or service hosted on a different domain. Authenticated sessions that have aged beyond a pre-determined time span, or have "timed out," can be refreshed so as to remain valid. However, session refreshes are limited to a single domain, forcing a user to authenticate each individual domain upon the expiration of an authenticated session across multiple domains.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize redirection techniques to refresh an authenticated session for a web-based executable operated across multiple domains. In at least some embodiments, the redirection techniques utilize a hidden inline frame ("i-frame") to refresh an authenticated session. In some embodiments, polling is utilized to detect the end of a redirection sequence and a refreshed authenticated session while in other embodiments, an authenticated session is assumed to be refreshed after the expiration of a predetermined period of time.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments utilize redirection techniques to refresh an authenticated session for a web-based executable operated across multiple domains. In at least some embodiments, the redirection techniques utilize a hidden inline frame ("i-frame") to refresh an authenticated session. In some embodiments, polling is utilized to detect the end of a redirection sequence and a refreshed authenticated session while in other embodiments, an authenticated session is assumed to be refreshed after the expiration of a predetermined period of time.

In the discussion that follows, a section entitled "Example Operating Environment" describes an operating environment in accordance with one or more embodiments. Next, a section entitled "Example Embodiment" describes various embodiments of a web-based executable module operated across multiple domains. In particular, the section describes authenticated session refreshing in accordance with one or more embodiments. In a subsection entitled "Polling Module," an example polling module in accordance with one or more embodiments is described. Finally, a section entitled "Example System" is provided and describes an example system that can be used to implement one or more embodiments.

Consider, now, an example operating environment in accordance with one or more embodiments.

Example Operating Environment

Figure 1:
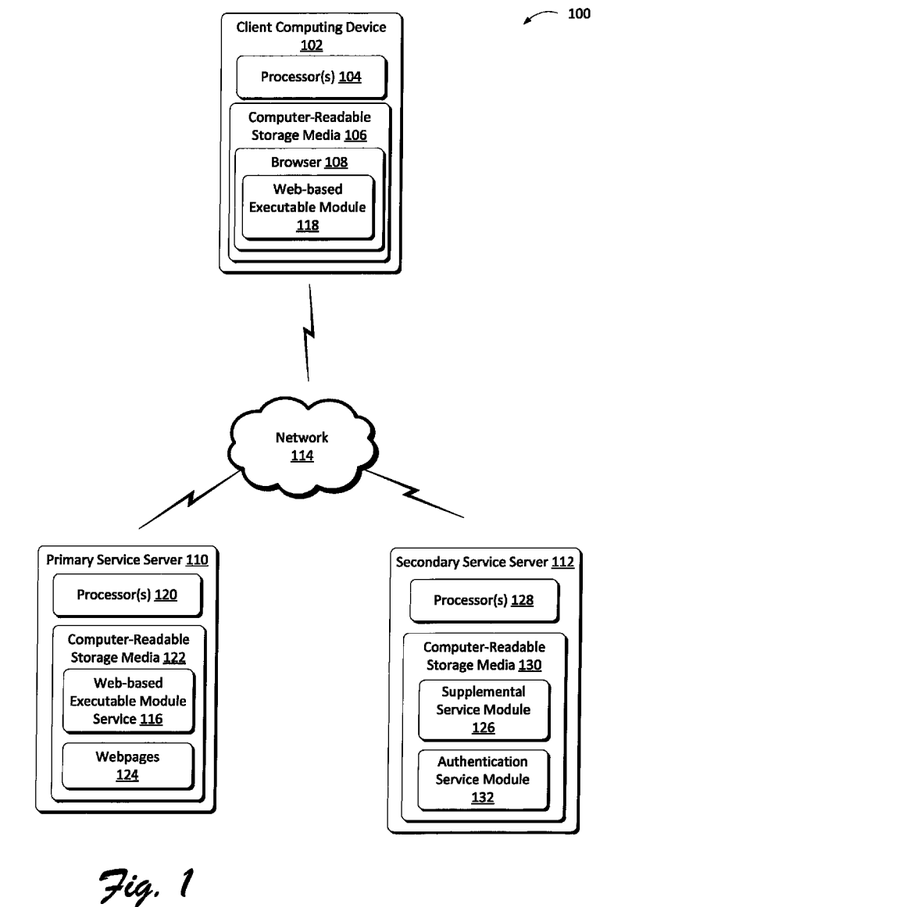
FIG. 1 is an illustration of an example environment in accordance with one or more embodiments.

FIG. 1 is an illustration of an example environment 100 in accordance with one or more embodiments. Environment 100 includes a client computing device 102 including one or more processors 104 and computer-readable storage media 106. Client computing device 102 can be embodied as any suitable computing device such as, by way of example and not limitation, a desktop computer, a portable computer, a netbook, a handheld computer such as a personal digital assistant (PDA), cell phone, and the like.

Computer-readable storage media 106 includes a software executable module in the form of a web browser 108. Web browser 108 can receive content from and send content to other servers, such as primary service server 110 and secondary service server 112, via a network 114, such as the Internet. Such content can include any suitable type of content that can be received from and sent to websites hosted by the servers.

In various embodiments, primary service server 110 hosts web-based executable module service 116. Primary service server 110 also includes one or more processors 120 and computer-readable storage media 122 on which at least part of web-based executable module service 116 resides. Web-based executable module service 116 can provide one or more executable modules, such as web-based executable module 118, that can be downloaded to a client device, such as client computing device 102. In the embodiment shown in FIG. 1, web-based executable module 118 can be executed as part of browser 108.

Once downloaded on a device, web-based executable module 118 can interact with services or webpages hosted on multiple domains residing on multiple servers, such as on both primary service server 110 (e.g., webpages 124) and secondary service server 112 (e.g., supplemental service module 126), as well as other servers. For example, web-based executable module 118 can interact with a service provided by supplemental service module 126 on secondary service server 112, and is said to be a cross-domain executable or cross-domain application. One or more of the services utilize an authenticated session for enabling interaction with content.

Various embodiments utilize redirection techniques to navigate the browser 108 to an authentication service module 132 and refresh an authenticated session for a secondary domain, such as a domain hosted by secondary service server 112 and embodied as supplemental service module 126. Upon refreshing an authenticated session for the secondary domain, the browser 108 can access content provided by the supplemental service module 126 via web-based executable module 118. In general, web-based executable module 118 can initiate a redirection sequence to direct the browser 108 to a series of webpages to refresh an authenticated session for the secondary domain. For example, the redirection sequence can cause the cookies for an authenticated session for the secondary domain to be refreshed. In at least some embodiments, the browser 108 can be redirected in a hidden i-frame in order to refresh the authenticated session. Such is described below in more detail.

In the embodiment illustrated in FIG. 1, secondary service server 112 includes one or more processors 128 and computer-readable storage media 130. Computer-readable storage media includes an authentication service module 132 configured to provide an authenticated session for the secondary domain. In alternate embodiments, authentication service module 132 can reside on another server in communication with network 114 rather than on the secondary service server 112.

In some embodiments, web-based executable module 118 interacts with services hosted on additional domains on additional servers, not shown. In such embodiments, additional supplemental service modules can reside on additional service servers (not shown) communicatively coupled to network 114. Additional authentication service modules can be employed to provide authenticated sessions to these additional services.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example operating environment, consider now a discussion of functionality associated with web browser 108.

Example Embodiment

Figure 2:
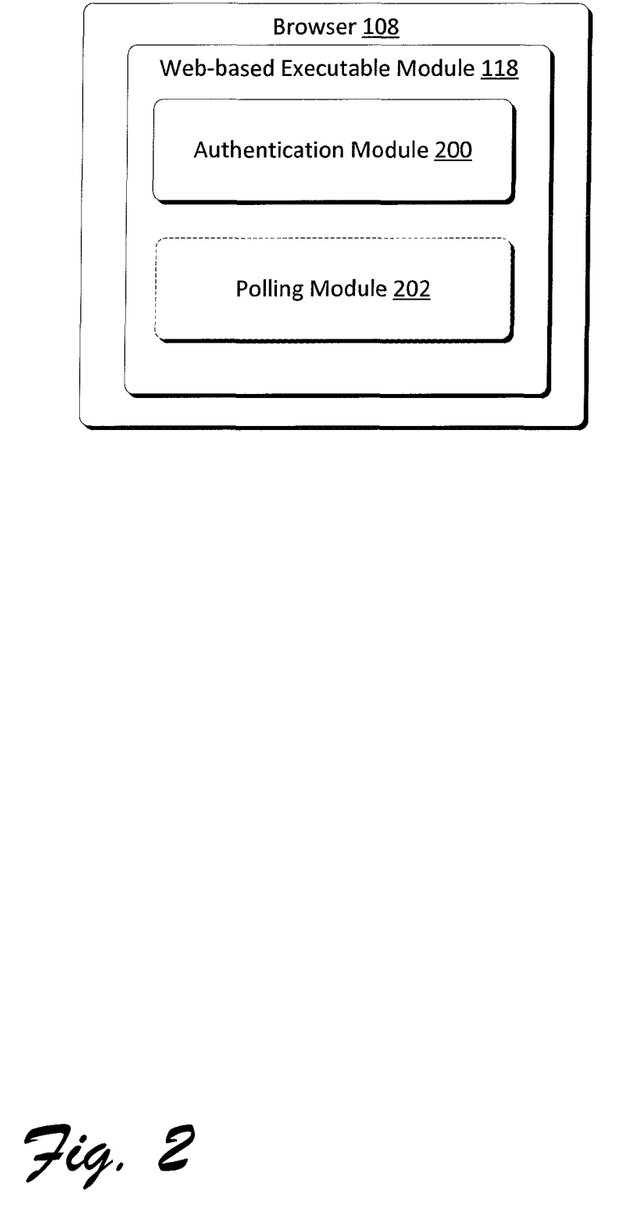
FIG. 2 illustrates an example web browser in accordance with one or more embodiments.

FIG. 2 illustrates an example web browser in accordance with one or more embodiments. In some embodiments, such as the one shown in FIG. 2, web-based executable module 118, as part of browser 108, can include an authentication module 200 and an optional polling module 202.

In various embodiments, a set of cookies is used to represent an authenticated session for a service hosted on a secondary domain, referred to herein as a supplemental service. Cookies enable a website to send state information to a user's browser and for the browser to return state information to the website. The state information can be used for authentication, enabling a user to access content provided by the website during an authenticated session. In these embodiments, authentication module 200 determines whether a call from a user's browser, such as browser 108, carries valid cookies representing an authenticated session. An unexpired or valid cookie can enable user interaction with content provided by the supplemental service through the web-based executable module 118.

In various embodiments, if the authentication module 200 determines that the authenticated state of a secondary domain is stale, the authentication module 200 can initiate a redirection sequence to refresh the authenticated session. For example, cookies can include an expiration time and/or a maximum age, after which the cookie is deleted from the browser. In some embodiments, cookies can expire if the user does not access the website or interact with the content or service provided by the website for a period of time chosen by the server. Upon the expiration and deletion of the cookies, the authenticated state is referred to as "stale."

In some embodiments, the authentication module causes browser 108 to launch an i-frame after detection of a stale authentication state by authentication module 200. A hidden i-frame within the browser can enable the redirection sequence to be hidden from user view, so as to reduce or even eliminate interruption to the user during interaction with web-based executable module 118.

The browser 108 processes information received from one or more servers, such as primary service server 110 and secondary service server 112, and causes at least a portion of the information to be rendered within an i-frame in the browser. The i-frame functions as a subwindow within browser 108. For example, an i-frame can be used to display a second website within a first website. In various embodiments, the i-frame is hidden or invisible to the user, enabling the browser to access multiple webpages without displaying these pages to a user. For example, the hidden i-frame can be redirected to one or more pages in order to refresh an authenticated session without being visually detected by a user.

In embodiments including polling module 202, the i-frame is polled to determine if the redirection sequence was completed. In particular, the polling module 202 polls the i-frame for an expected page uniform resource locator (URL) at the end of the redirection sequence. For example, polling module 202 can determine a domain to which the i-frame is directed. If the i-frame is directed to a secondary domain, e.g., a page hosted on secondary service server 112, the polling module 202 determines that the redirection sequence has not completed and the browser may not be able to display the content from the secondary domain without encountering one or more errors. However, once the redirection sequence has completed, the i-frame is directed to the primary domain, e.g., one of webpages 124 hosted on primary service server 110, and the polling module 202 determines that the redirection sequence was completed. Upon completion of the redirection sequence, the authentication session is refreshed, and the web-based executable module can resume its interaction with services on secondary domains.

Figure 3:
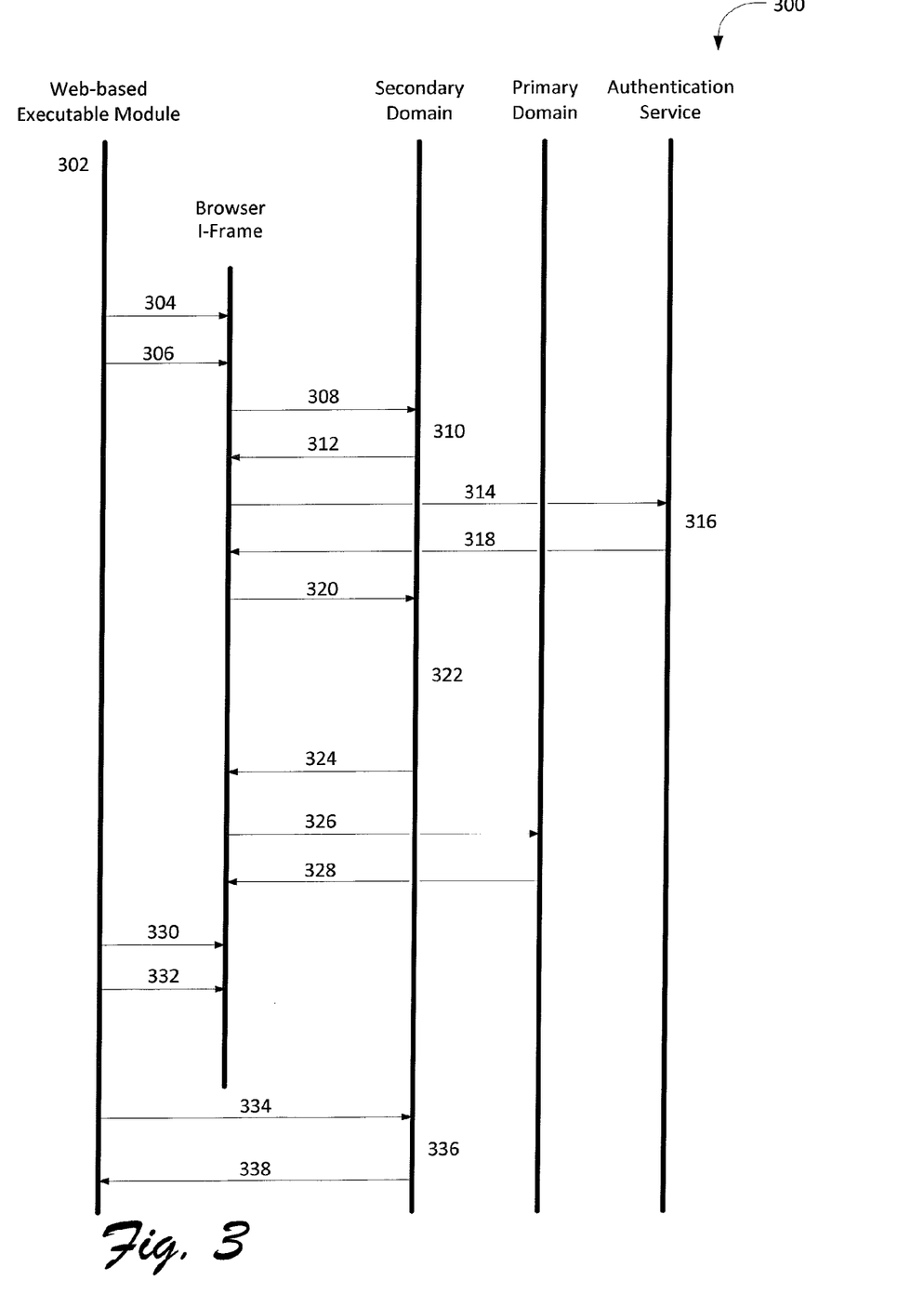
FIG. 3 is a data flow diagram that illustrates a data flow in accordance with one or more embodiments.
Figure 4:
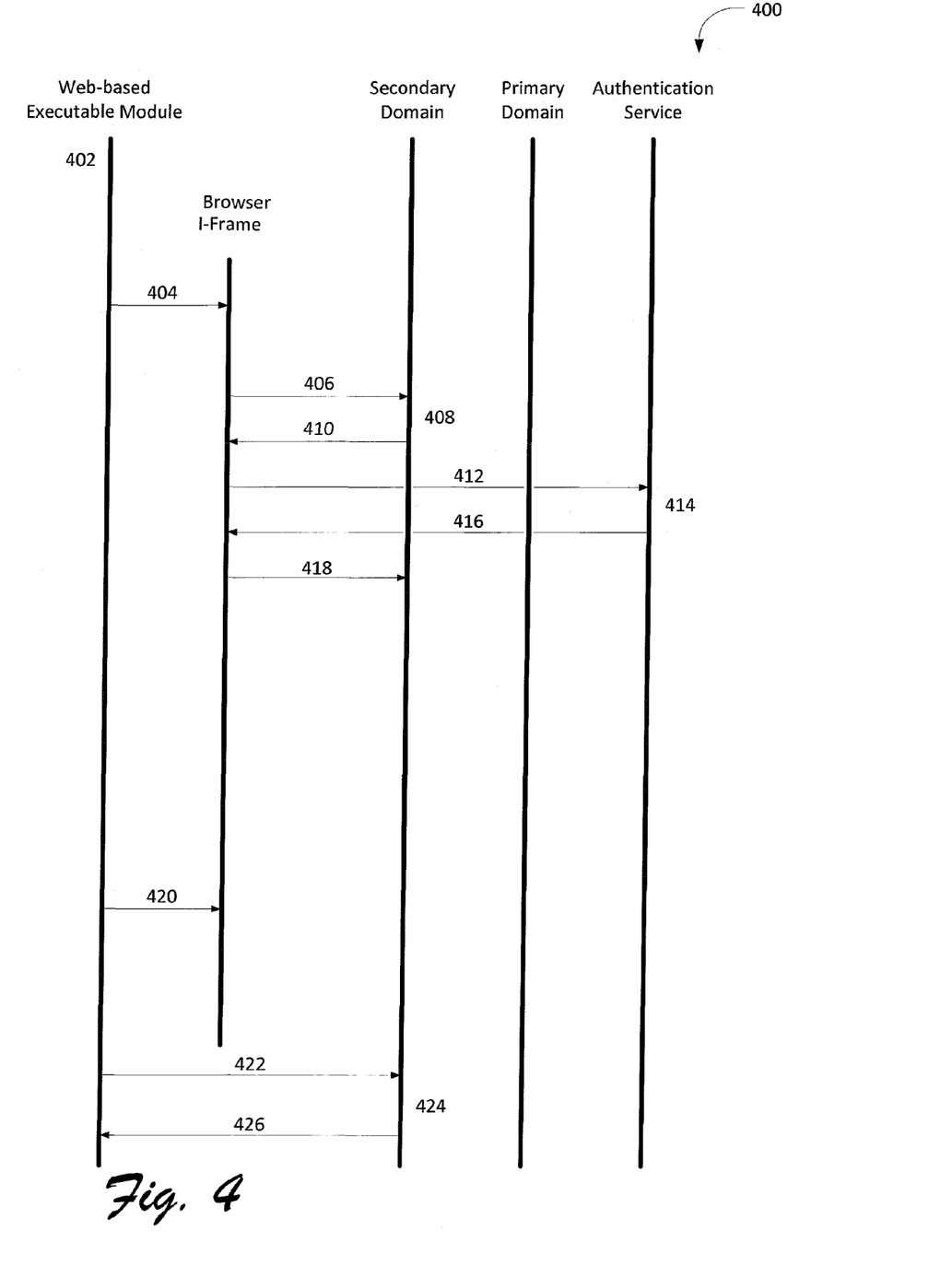
FIG. 4 is a data flow diagram that illustrates a data flow in accordance with one or more embodiments.

Having described an example web browser 108, consider now example data flows utilizing redirection techniques to refresh an authenticated session. FIG. 3 illustrates data flow in embodiments including both an i-frame and a polling module, while FIG. 4 illustrates data flow in embodiments including an i-frame and no polling module.

In FIG. 3, the data flow 300 between a web-based executable module, a primary domain, a secondary domain, and an authentication service is shown (and designated) in accordance with one or more embodiments. FIG. 3 also illustrates a browser i-frame that is included in the data flow. In this example, the primary domain is the domain on which the web-based executable module service is hosted, while the secondary domain is the domain on which a supplemental service is hosted. The authentication service can be hosted on the secondary domain or can be provided by a third party, depending on the particular embodiment, provided the authentication service can provide a valid session on the secondary domain.

At 302, the web-based executable module ascertains that the authenticated state of the secondary domain is stale. This can be performed in any suitable way. For example, an authentication module included in the web-based executable module can determine that the cookies representing the authenticated session for the secondary domain have expired or have been deleted from the user's browser. The web-based executable then initiates a redirection sequence and, at 304, causes the browser to launch an i-frame in the user's browser. Along with causing the browser to launch an i-frame, the web-based executable also provides information regarding a first page for the browser to request to be launched in the i-frame.

At 306, polling is initiated. This can be performed in any suitable way, examples of which are provided above and below. In general, a polling module requests the information associated with the location to which the i-frame is directed on a generally continuous basis to determine if the redirection sequence is completed.

At 308, the browser requests a session refresh page from the secondary domain to be launched in the i-frame. Information regarding the session refresh page was provided by the web-based executable at 304. The secondary domain receives the request for a session refresh page and detects the stale authentication session at 310. For example, the secondary domain can determine that the browser does not have a valid set of cookies. At 312, the secondary domain responds to the browser by redirecting the i-frame to an authentication service.

At 314, the browser requests a session refresh for the secondary domain from the authentication service to be launched in the i-frame. At 316, the authentication service receives the request and refreshes the authenticated session. For example, the authentication service issues a token to reset the cookies representing the authenticated session for the secondary domain. At 318, the authentication service redirects the browser i-frame to the secondary domain.

At 320, the browser again requests a session refresh page from the secondary domain to be launched in the i-frame after the authentication service has refreshed the authenticated session. At 322, the secondary domain processes the page request with the authenticated session. This can be performed in any suitable way. For example, a session refresh page hosted on the secondary domain can refresh the cookies on the secondary domain.

At 324, the secondary domain instructs the browser to redirect the i-frame to a receiving page on the primary domain. Upon receiving the instruction to redirect from the secondary domain, at 326, the browser requests a receiving page from the web-based executable module's primary domain to be launched in the i-frame. The primary domain responds with a page at 328.

At 330, the polling module requests information associated with the location to which the i-frame is directed and determines that the i-frame is directed to the primary domain, indicating that the redirection sequence was completed. At 332, the web-based executable module instructs the browser to close the i-frame.

At 334, the user interacts with the web-based executable module including the supplemental service provided by the secondary domain, and the web-based executable module sends a service request to the secondary domain. For example, the web-based executable module sends a request to display content hosted on the secondary domain. At 336, the secondary domain detects that the authenticated session is valid, and at 338, the secondary domain grants the service request.

Turning now to FIG. 4, data flow 400 between a web-based executable module, a primary domain, a secondary domain, and an authentication service is shown. FIG. 4 also illustrates a browser i-frame included in the data flow. In this example, the primary domain is the domain on which the web-based executable module service is hosted while the secondary domain is the domain on which a supplemental service is hosted. The authentication service can be hosted on the secondary domain or can be provided by a third party, depending on the particular embodiment, provided the authentication service can provide a valid session on the secondary domain.

At 402, the web-based executable module ascertains that the authenticated state of the secondary domain is stale. This can be performed in any suitable way. For example, the web-based executable module can include an authentication module configured to determine that the cookies representing the authenticated session for the secondary domain have expired or have been deleted from the user's browser. The web-based executable initiates a redirection sequence and, at 404, causes the browser to launch an i-frame in the user's browser. Along with causing the browser to launch an i-frame, the web-based executable also provides information regarding a first page for the browser to request to be launched in the i-frame.

At 406, the browser requests a session refresh page from the secondary domain to be launched in the i-frame. The secondary domain receives the request for a session refresh page and detects the stale authentication session at 408. For example, the secondary domain determines that the browser does not have a valid set of cookies. At 410, the secondary domain responds to the browser by redirecting the i-frame to an authentication service.

At 412, the browser requests a session refresh for the secondary domain from the authentication service to be launched in the i-frame. At 414, the authentication service receives the request and refreshes the authenticated session. For example, the authentication service issues a token to reset the cookies representing the authenticated session for the secondary domain. At 416, the authentication service redirects the browser i-frame to the secondary domain.

At 418, the browser again requests a session refresh page from the secondary domain to be launched in the i-frame after the authentication service has refreshed the authenticated session.

Upon an expiration of a period of time, at 420, the web-based executable module can instruct the browser to close the i-frame. The web-based executable module can instruct the browser to close the i-frame at a specified time after launching, at which time the redirection sequence is presumed to have completed. The time period between launching and being instructed to end can vary depending on the particular embodiment. For example, the time period can be longer in embodiments including additional domains and redirections.

At 422, the user interacts with the web-based executable module including the supplemental service provided by the secondary domain, and the web-based executable module can send a service request to the secondary domain. For example, the web-based executable module request to display content hosted on the secondary domain. At 424, the secondary domain detects that the authenticated session is valid, and at 426, the secondary domain grants the service request.

Having considered data flows utilizing redirection techniques to refresh an authenticated session both including and not including polling, consider now an example polling module.

Polling Module

Figure 5:
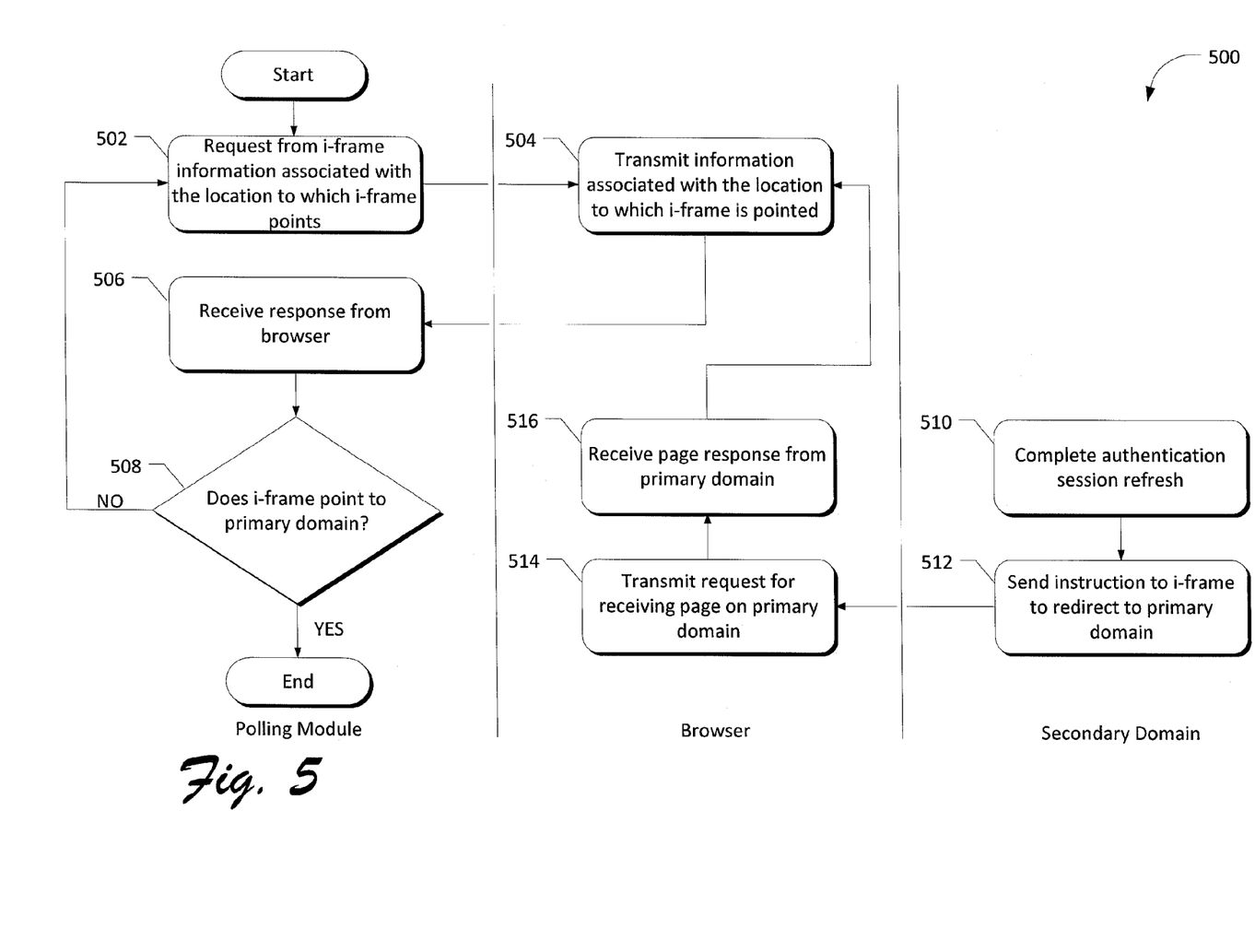
FIG. 5 is a flow diagram that describes steps in a method in accordance with one or more embodiments.

FIG. 5 is a flow diagram that describes steps in an example polling method 500 that can be executed by a polling module, such as polling module 202 in FIG. 2, in accordance with one or more embodiments. In the illustrated example, some of steps of the method are illustrated as being performed by a "Polling Module," other steps of the method are illustrated as being performed by a "Browser," and other steps of the method are illustrated as being performed by a "Secondary Domain."

When polling begins, at block 502, the polling module requests from the browser information associated with a location to which the i-frame points. This can be performed in any suitable way. At block 504, the browser transmits information associated with the location to which the i-frame is pointed, back to the polling module, and at block 506, the polling module receives the response from the browser.

At decision block 508, the polling module determines if the i-frame points to a page on the primary domain of the web-based executable module. If not, for example, when the i-frame is directed to a page on the secondary domain or to the authentication service, the polling module returns to block 502 and again requests from the browser information associated with the location to which the i-frame is pointed.

During the redirection sequence, such as shown in FIG. 3, when the browser requests a session refresh page from the secondary domain to be launched in the i-frame after refreshing the authentication session (320 in FIG. 3), at block 510, the secondary domain completes the authentication session refresh. This can be performed in any suitable way. For example, the secondary domain can process the page request with the authenticated session and reset the cookies on the secondary domain.

At block 512, the secondary domain sends an instruction to the browser to redirect the i-frame to the primary domain. After receiving the instruction to redirect to the primary domain, at block 514, the browser transmits a request for a receiving page on the primary domain to be launched in the i-frame. At block 516, the browser receives the page response from the primary domain and the i-frame is pointed to the primary domain.

Once the i-frame is pointed to the primary domain, upon receiving the next request to provide the location to which the i-frame points, the browser at block 504 transmits information associated with the location to the polling module. At block 506, the polling module receives the response from the browser, and at decision block 508 determines if the i-frame points to the primary domain. If the i-frame points to the primary domain, indicating that the redirection sequence was completed, the polling process ends.

Having described an example method of polling to determine completion of a redirection sequence, consider now a discussion of an example system that can be used to implement one or more embodiments.

Example System

Figure 6:
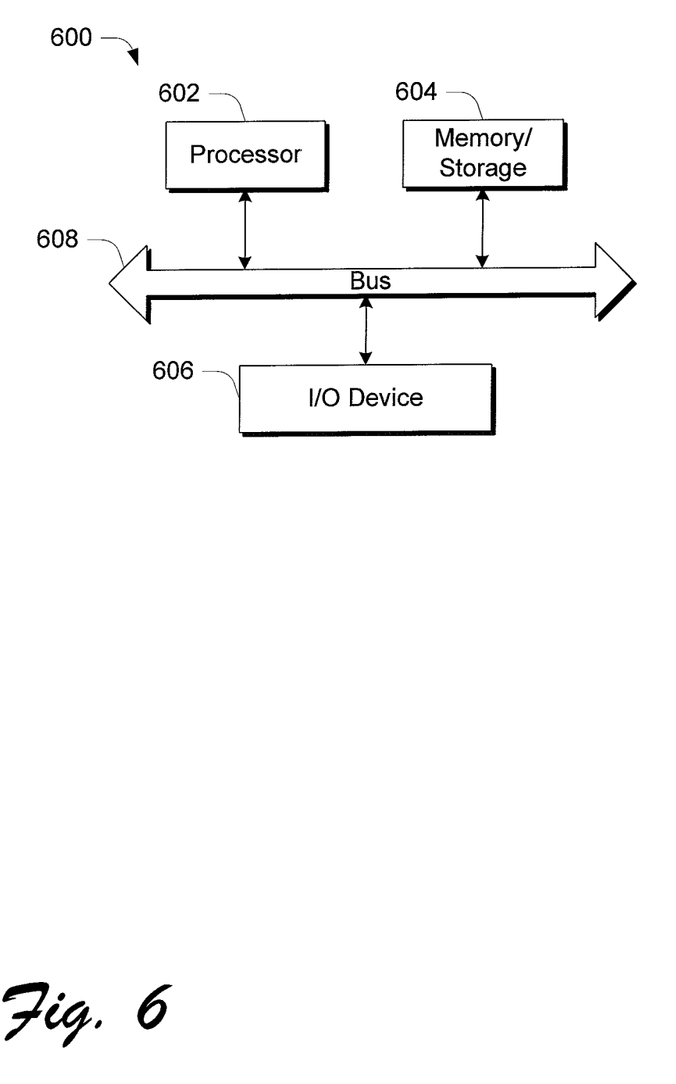
FIG. 6 illustrates an example system that can be utilized to implement one or more embodiments.

FIG. 6 illustrates an example computing device 600 that can be used to implement the various embodiments described above. Computing device 600 can be, for example, client computing device 102 of FIG. 1, or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), flash memory, optical disks, magnetic disks, and so forth). Component 604 can include fixed media (e.g., RAM, ROM, a fixed hard drive, etc.) as well as removable media (e.g., a flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. One or more computer-readable storage memories comprising instructions that are executable to cause a device to perform a process comprising:

ascertaining a state of an authenticated session of at least one secondary domain, the at least one secondary domain hosting one or more services with which a web-based executable provided by a primary domain interacts;

responsive to the state of the authenticated session being stale, causing a redirection to an authentication service effective to refresh the authenticated session of the at least one secondary domain; and responsive to the authenticated session being refreshed, interacting with the one or more services hosted by the at least one secondary domain.

2. The one or more computer-readable storage memories of claim 1, the process further comprising:

causing an i-frame to be launched within a browser;

wherein said causing comprises causing the i-frame to be redirected to the authentication service effective to refresh the authenticated session of the at least one secondary domain.

3. The one or more computer-readable storage memories of claim 2, the process further comprising causing the i-frame to be redirected to a page on the primary domain.

4. The one or more computer-readable storage memories of claim 2, the process further comprising:

requesting, from the browser, information associated with a location to which the i-frame is directed;

receiving from the browser the requested information;

determining, based upon the received information, if the i-frame is directed to the primary domain or a secondary domain; and responsive to the i-frame being directed to the primary domain, causing the i-frame to be closed.

5. The one or more computer-readable storage memories of claim 2, the process further comprising:

causing the i-frame to be closed upon expiration of a period of time.

6. The one or more computer-readable storage memories claim 1, the process further comprising:

causing a hidden i-frame to be launched within a browser;

wherein said causing comprises causing the i-frame to be redirected to the authentication service effective to refresh the authenticated session of the at least one secondary domain.

7. The one or more computer-readable storage memories of claim 6, the process further comprising causing the hidden i-frame to be redirected to a page on the primary domain.

8. The one or more computer-readable storage memories of claim 6, the process further comprising:

requesting, from the browser, information associated with a location to which the hidden i-frame is directed;

receiving from the browser the requested information;

determining, based upon the received information, if the hidden i-frame is directed to the primary domain or a secondary domain; and responsive to the hidden i-frame being directed to the primary domain, causing the hidden i-frame to be closed.

9. The one or more computer-readable storage memories of claim 6, the process further comprising causing the hidden i-frame to be closed upon expiration of a period of time.

10. A computer-implemented method comprising:

causing a web-based executable to be displayed in a browser, the web-based executable being provided by a primary domain and configured to interact with one or more services hosted by at least one secondary domain;

accessing an authentication service associated with the at least one secondary domain effective to refresh an authenticated session for the at least one secondary domain; and causing the web-based executable to interact with the one or more services hosted by the at least one secondary domain.

11. The computer-implemented method of claim 10, wherein cookies are used to refresh the authenticated session for the at least one secondary domain.

12. The computer-implemented method of claim 10, wherein said accessing comprises using an i-frame within the browser to access the authentication service.

13. The computer-implemented method of claim 12, further comprising hiding the i-frame from display in the browser.

14. The computer-implemented method of claim 12, further comprising:

launching an i-frame within the browser, the i-frame being configured to access the authentication service associated with the at least one secondary domain effective to refresh the authenticated session for the at least one secondary domain; and accessing one or more pages on the at least one secondary domain after the authenticated session for the at least one secondary domain is refreshed by the authentication service.

15. The computer-implemented method of claim 14 further comprising launching a session refresh page on the at least one secondary domain in the i-frame.

16. The computer-implemented method of claim 10, further comprising:

launching a hidden i-frame within the browser, the hidden i-frame being configured to access the authentication service associated with the at least one secondary domain effective to refresh the authenticated session for the at least one secondary domain; and accessing one or more pages on the at least one secondary domain after the authenticated session for the at least one secondary domain is refreshed by the authentication service.

17. The computer-implemented method of claim 16 further comprising launching a session refresh page on the at least one secondary domain in the hidden i-frame.

18. A device comprising:

one or more processors;

one or more computer-readable storage media;

one or more modules embodied on the one or more computer-readable storage media and executable under the influence of the one or more processors, the one or more modules comprising:

a web-based executable module provided by a primary domain and configured to interact with one or more services hosted on one or more secondary domains; and an authentication module configured to determine a state of an authenticated session of at least one secondary domain, the at least one secondary domain hosting one or more services with which the web-based executable interacts and configured to cause a browser to be redirected effective to refresh the authenticated session of at least one secondary domain.

19. The device of claim 18, the one or more modules further comprising:

a polling module configured to:

request from an i-frame launched by the browser information associated with a location to which the i-frame is directed;

determine if the i-frame is directed to the secondary domain; and when the i-frame is directed to the secondary domain, request from the i-frame information associated with the location to which the i-frame is directed at least one additional time.

20. The device of claim 18, the one or more modules further comprising:

a polling module configured to:

request from a hidden i-frame launched by the browser information associated with a location to which the hidden i-frame is directed;

determine if the hidden i-frame is directed to the secondary domain; and when the hidden i-frame is directed to the secondary domain, requesting from the hidden i-frame information associated with the location to which the hidden i-frame is directed at least one additional time.

* * * * *